March 9, 1937. F. E. WOLCOTT 2,072,934
DISPENSING BOWL
Filed April 29, 1935
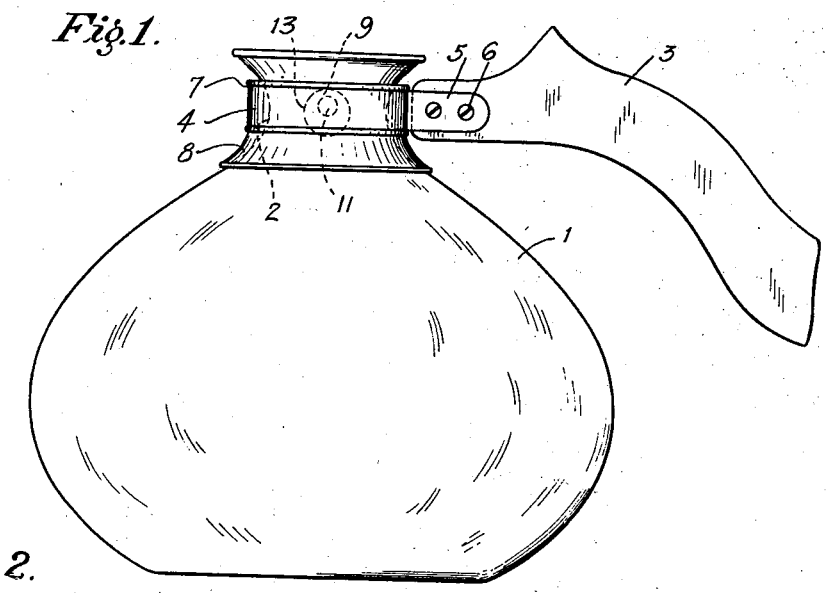
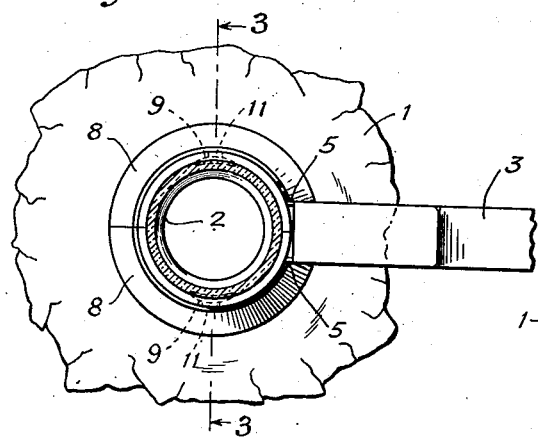
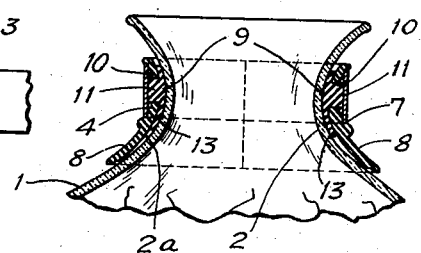
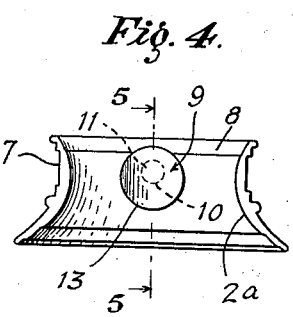
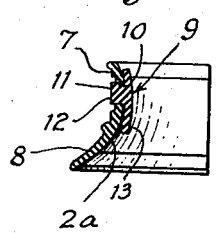
INVENTOR:
FRANK E. WOLCOTT
BY
ATTORNEY Patented Mar. 9, 1937

2,072,934

UNITED STATES PATENT OFFICE 2,072,934

DISPENSING BOWL

Frank E. Wolcott, West Hartford, Conn., assignor, by mesne assignments, to The Silex Company, a corporation of Connecticut (1936)

Application April 29, 1935, Serial No. 18,854

17 Claims. (Cl. 215—100)

My invention relates to dispensing bowls.

It has among its objects to provide an improved handle connection for such a bowl, and, more particularly, such an improved connection, especially adapted to use with coffee maker dispensing bowls. Other objects are to provide such an improved connection whereby the handle is definitely located angularly with respect to the bowl, while existing constructions are markedly improved and simplified although retaining their desired heat insulating characteristics. A further object of my invention is to provide an improved handle connection of the general type described and claimed in my Patent No. 1,977,367, and wherein both the handle and the heat insulating means grasped thereby are definitely located angularly relative to one another and the bowl. A further object of my invention is to provide improved heat insulating means for a handle, carrying improved means for inhibiting angular displacement between these insulating means, the bowl and the handle. A still further object of my invention is to provide improved means receivable in such heat insulating means and adapted to cooperate with the bowl neck and a handle in positioning the parts against angular displacements. These and other objects and advantages of my improved construction will, however, hereinafter more fully appear.

In the accompanying drawing, I have shown for purposes of illustration, one embodiment which my invention may assume in practice.

In this drawing,—

Figure 1 is a side elevation of a dispensing bowl equipped with my improvement;

Fig. 2 is a top plan view, partially in section, of a portion of this bowl;

Fig. 3 is an enlarged vertical sectional view on line 3—3 of Figure 2;

Fig. 4 is an enlarged side elevation of the inside of one of the heat insulating members equipped with one of my improved locating members;

Fig. 5 is a section view on line 5—5 of Figure 4;

Fig. 6 is a detail view of one of the locating members, the opposite side of the same being shown from that illustrated in Figure 4, and Fig. 7 is an end view of the member shown in Figure 6.

In this illustrative construction, I have shown a dispensing bowl 1, herein the lower bowl of a coffee maker, and having a curved neck 2 thereon, and a handle 3 having a band 4 encircling said neck below the flaring mouth and operatively connected to said neck through improved means hereinafter described.

While not limited thereto, it will be noted that this band 4 is herein in the form of a usual continuous spring band having its ends 5 suitably connected, as by screws 6, to the opposite sides of the adjacent end of the handle 3. Moreover, it will be noted that in this construction the band 4 lies in an external groove 7 in vertically divided heat insulating members 8 of the construction described and claimed in my Patent No. 1,977,367, filed January 26, 1932, and having curved inner portions 2a disposable around the round constricted portion or neck 2 of the bowl. Further, it will be noted that these members 8 carry my improved locating members, generally indicated at 9, which cooperate with the bowl neck 2 and the handle band 4 in an improved manner.

In my improved construction, it will be observed that each of the members 8, which are identical, is provided with a small lateral aperture 10 toward the top of the same and slightly above the point of maximum constriction of the member. In each aperture 10 is disposed an extension 11 on the locating member 9 which snugly fits the aperture 10 and projects beyond the same and also slightly beyond the bottom of the groove 7 in the member 8 so that the outer end 12 of this portion 11 is engaged by the inner face of the handle band 4. Moreover, it will be noted that the member 9 is provided with a larger, preferably slightly more thin portion 13 on its opposite end. Herein, this portion is in the form of a disc, eccentrically disposed relative to the portion 11 and adapted to have one face engage and conform to the inside surface of the member 8, while its opposite face engages and conforms to the outside surface of the glass neck 2 which outside surface is curved in vertical planes as well as horizontal planes. In a preferred construction, it will also be observed that the member 9 is disposed in the aperture 10 as shown in Figure 3, i. e. with a greater length of the portion 13 below the aperture 10, it being found that this arrangement is particularly effective in locating the parts. Attention here is also directed to the fact that the member 9, while not limited thereto, is preferably formed of live rubber, as it is found that the latter is well adapted to conform as needed, while also acting to grip the band 4 and neck 2 frictionally in an effective manner.

In the use of my improved construction, the engagement of the inner surface of the portion 13 with the outside of the bowl neck 2 and the interlocking of the members 9 with the members 8, serves effectually to prevent relative rotation between the members 8 and the bowl neck when these members 8 are pressed upon the neck. Further, it will be evident that, with the members 9 interlocked with the members 8 and the projecting ends 12 on the portions 11 engaging the inside of the band 4, relative rotation between the latter and the member 8 will also be effectually prevented. Thus the members 9 acting as elastic friction plugs, effectually cooperate with the bowl neck on the one hand and the handle band on the other, and through their interlocking relation with the members 8 serve to prevent relative displacement between the parts 4, 8 and 2.

It will be noted that my improved construction, wherein only small frictional spot forming means are required, eliminates all need for providing or applying the one or more large, expensive and troublesome rubber bands fitting about the neck and heretofore required. Moreover, it is an exceedingly conveniently applied construction; it only being necessary to project the portions 11 on the members 9 through the apertures 10 and then connect the parts in the usual manner. In practice, also, it is found that if the portions 11 are provided with a snug fit in the apertures 10, the members 9 will be retained therein as necessary during handling. Further, through making the members 9 of soft rubber, it will be noted that a very firm grip is made possible, while through the use of this material and the larger portion 13 and smaller portion 11, an effective distribution of the grip is provided in accordance with requirements. Moreover, through the shape of the portions 13 and their arrangement relative to the portions 11 and the bowl neck, it will be observed that it is possible for the members 9 to adapt themselves to varying conditions and sizes, as required, without difficulty. Of course, also, the members 9 can be supplied at small expense, while the cost of adapting standard members 8 to receive the same is also small. These and other advantages of my improved construction will, however, be clearly apparent to those skilled in the art.

While I have in this application specifically described one embodiment which my invention may assume in practice, it will be understood that the same is shown for purposes of illustration, and that the invention may be modified and embodied in various other forms without departing from its spirit or the scope of the appended claims.

What I claim as new and desire to secure by Letters Patent is:—

1. A dispensing bowl structure for coffee makers comprising a bowl having a neck, a handle portion surrounding the neck, and rotation inhibiting means between said handle portion and said neck including a plug-like member having its axis disposed radially of the neck and provided with an inner part frictionally engaging and conforming to said neck, said member having an outer part engaged with said handle portion to prevent relative movement of said member and handle portion in the direction of the neck circumference.

2. A dispensing bowl having a neck curved in vertical planes, a handle having a portion surrounding the latter, and rotation inhibiting means between said handle portion and neck comprising an elastic friction plug having engagement with said handle portion preventing relative movement of said plug and said handle portion in the direction of the neck circumference and provided with an enlarged inner part frictionally engaging and conforming to the curved neck.

3. A dispensing bowl having a neck, a handle having a portion surrounding the latter, and rotation inhibiting means between said handle portion and neck comprising an elastic friction plug engaging both said portion and neck, said plug having a relatively large friction surface at one end engaging the neck and a relatively small friction surface at the other end engaging the handle portion.

4. A dispensing bowl having a neck, a handle having a portion surrounding the latter, and rotation inhibiting means between said handle portion and neck comprising a neck embracing member embraced by said handle portion and spot forming friction means carried by said member and frictionally engaging both said portion and said neck.

5. A dispensing bowl having a neck, a handle having a portion surrounding the latter, and rotation inhibiting means between said handle portion and neck comprising heat insulating means and friction means interlocked therewith and engaging both said portion and said neck.

6. A dispensing bowl having a neck, a handle having a portion surrounding the latter, and rotation inhibiting means between said handle portion and neck comprising vertically divided heat insulating means, and a resilient member interlocked with one section of said heat insulating means and engaging both said portion and said neck.

7. A dispensing bowl having a neck, a handle having a portion surrounding the latter, and rotation inhibiting means between said handle portion and neck comprising cooperating heat insulating means having spaced apertures therein and friction means seated in said apertures and engaging said portion and said neck.

8. A dispensing bowl having a neck, a handle having a portion surrounding the latter, and rotation inhibiting means between said handle portion and neck comprising cooperating heat insulating means having spaced apertures therein and friction means seated in said apertures having flexible portions engaging and conforming to said portion and said neck.

9. In combination, a bowl having a neck, externally grooved heat insulating members thereon, a friction member interlocked with one of said members and engaging said neck and extending into said groove, and a handle having a band disposed in said groove and engaging said friction member.

10. In combination, a bowl having a neck, externally grooved heat insulating members thereon, a friction member interlocked with one of said members and engaging said neck and extending into said groove, and a handle having a band disposed in said groove and engaging said friction member, said friction member having flexible friction portions, one engaging said band and the other said neck.

11. In combination, a bowl having a neck, heat insulating members thereon, a friction member interlocked with one of said members and engaging said neck, and a handle having a band engaging said friction member, said friction member having eccentrically disposed portions of different size, with the smaller engaging said band and the larger engaging said neck.

12. In a handle connection, a heat insulating member engageable with a bowl neck and having a lateral aperture in the neck engaging portion, and a friction member disposed in said aperture and projecting beyond both ends of the same.

13. In a handle connection, a heat insulating member engageable with a bowl neck and having a lateral aperture in the neck engaging portion, and a friction member disposed in said aperture and projecting beyond both ends of the same, said friction member being resilient.

14. In a handle connection, a heat insulating member engageable with a bowl neck and having a lateral aperture in the neck engaging portion, and a friction member disposed in said aperture and projecting beyond both ends of the same, said friction member having projecting faces of different size at opposite ends of said aperture.

15. In a handle connection, a heat insulating member engageable with a bowl neck and having a lateral aperture in the neck engaging portion, and a friction member disposed in said aperture and projecting beyond both ends of the same, said heat insulating member having an external groove, and said friction member having a portion projecting through said aperture into said groove and an enlarged portion outside the opposite end of said aperture.

16. An angularly adjustable bowl-neck-engaging member for bowl supports comprising a flexible disc which frictionally engages and conforms to the bowl neck and a supporting portion for said member projecting eccentrically from the disc.

17. In a coffee maker, a bowl having a round constricted neck curved in vertical planes, a handle structure for said bowl including a member embracing the same at said constricted neck and provided with a small aperture in the side thereof, and an elastic plug snugly but detachably fitting said aperture and having at its inner end a disc-like flexible portion of substantially greater diameter than said aperture disposed flatwise between said member and said neck and spacing the same apart and frictionally engaging and conforming to the outer surface of the neck.

FRANK E. WOLCOTT.